(12) United States Patent
Ichikawa (10) Patent No.: US 8,922,709 B2
(45) Date of Patent: Dec. 30, 2014

(54) IMAGE CAPTURING DEVICE

(75) Inventor: Shinichi Ichikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 13/431,089

(22) Filed: Mar. 27, 2012

(65) Prior Publication Data

US 2012/0249865 A1 Oct. 4, 2012

(30) Foreign Application Priority Data

Mar. 30, 2011 (JP) .................................. 2011-076380

(51) Int. Cl.
*H04N 5/225* (2006.01)

(52) U.S. Cl.
CPC ...... *H04N 5/2252* (2013.01); *H04N 2005/2255* (2013.01)
USPC ............................ 348/374; 348/244; 348/294

(58) Field of Classification Search
USPC .................................. 348/373, 374, 244, 294
See application file for complete search history.

(56) References Cited

U.S. PATENT DOCUMENTS

| 2006/0161940 A1* | 7/2006 | Arai et al. .................... 720/685 |
| 2008/0316344 A1* | 12/2008 | Yamamiya .................... 348/294 |
| 2009/0109330 A1* | 4/2009 | Nakano et al. ................ 348/374 |
| 2011/0006300 A1 | 1/2011 | Mochizuki et al. |

FOREIGN PATENT DOCUMENTS

| JP | 3309429 B2 | 7/2002 |
| JP | 2003-303945 A | 10/2003 |
| JP | 2004-179266 A | 6/2004 |
| JP | 2004-200768 A | 7/2004 |
| JP | 2011-18777 A | 1/2011 |

OTHER PUBLICATIONS

Japanese Office Action dated May 21, 2013 for Application No. 2011-076380.
Pretrial Inquiry dated Dec. 10, 2013 issued in Japanese Patent Application No. 2011-76380.

* cited by examiner

*Primary Examiner* — Paul Berardesca
(74) *Attorney, Agent, or Firm* — Birch, Stewart, Kolasch & Birch, LLP (57) ABSTRACT

An image capturing device is provided that can effectively suppress moisture penetration into a chamber, caused by cooling a CCD, the image capturing device including the CCD serving as an image capturing element, a chamber that accommodates the CCD at the inside thereof, a Peltier element that is provided inside the chamber and that cools the CCD, a flexible substrate that is provided to be across over an inside and an outside of the chamber and that connects the CCD to an electronic circuit which is outside the chamber, at least both sides of a portion of the flexible substrate, which portion is outside the chamber, being covered with an aluminum foil.

9 Claims, 7 Drawing Sheets

IMAGE CAPTURING DEVICE

CROSS-REFERENCE TO RELATED APPLICATION

This application claims priority under 35 USC 119 from Japanese Patent Application No. 2011-076380 filed Mar. 30, 2011, the disclosure of which is incorporated by reference herein.

BACKGROUND OF THE INVENTION

1. Field of the Invention

The present invention relates to an image capturing device, and in particular, to an image capturing device that captures an image by using a CCD that is enclosed in a chamber.

2. Related Art

Devices such as lumino image analyzers for detecting and analyzing chemiluminescence and bioluminescence, cameras for astronomical observation, and the like must capture weak light, and therefore, an ultra-high sensitivity cooling CCD camera is used in these devices.

In an ultra-high sensitivity cooling camera, in order to capture weak light, the CCD is cooled to −20° C. to −30° C. so as to suppress dark noise, and further, the chamber that accommodates the CCD is shielded from light such that light, other than the light for which capture is intended, does not enter the CCD.

As such a chamber, there is a sealed container for CCD cooling having: an FPC substrate on which a CCD is placed, and that supplies electric power for cooling to a CCD sealed container, and is for outputting image signals obtained by the CCD; a first cover that seals a first surface of the FPC substrate; a first seal member that is provided at the contacting portion of the FPC substrate and the first cover; a second cover that seals a second surface of the FPC substrate; and a second seal member that is provided at the contacting portion of the FPC substrate and the second cover. (Refer to Japanese Patent No. 3309429.)

However, when cooling the CCD that is accommodated in the chamber, the humidity within the chamber greatly decreases, and therefore, moisture at the exterior of the chamber is drawn into the interior of the chamber.

Further, if moisture penetrates into the chamber, there may be a case in which water stays between the electrodes of the Peltier element that is provided in the chamber in order to cool the CCD, and the electrodes short-circuit so poor cooling occurs. Further, if moisture adheres to the wiring within the chamber, such as the terminal portions of the CCD, and the electrode portions of the CCD substrate and the flexible substrate, and the like, these terminals may corrode or electricity may be conducted between these terminals, so there is the possibility that noise will increase.

Thus, an attempt has been made to prevent moisture from penetrating into the chamber by changing the seal, that is between the chamber and the flexible substrate that connects the CCD to an external electronic circuit, to an O-ring that is made of a fluorine rubber and has low moisture absorption, or by changing the material of the flexible substrate to a polyimide resin that has low moisture absorption.

Effects of a certain extent can be seen owing to these measures, but the preventing of penetration of moisture into the chamber interior is incomplete.

SUMMARY OF THE INVENTION

The present invention is made in order to overcome the above-described problems, and the present invention is to provide an image capturing device of a form that cools a CCD, that is enclosed within a chamber, by a cooling section provided within the chamber, and that can effectively suppress the penetration of moisture into the chamber due to the cooling of the CCD.

An invention of a first aspect relates to an image capturing device having: an image capturing element; a chamber that accommodates the image capturing element at an inner side of the chamber; a cooling section that is provided within the chamber, and that cools the image capturing element; and a substrate that is provided so as to bridge between (be across over) an inner side and an outer side of the chamber, and that connects the image capturing element to an electronic circuit provided at an exterior of the chamber, wherein at least both surfaces of a portion of the substrate at the outer side of the chamber are covered by a metal film.

In the image capturing device of the first aspect, the both surfaces of the portion of the substrate, which portion is at the outer side of the chamber, are covered by a metal film. Therefore, at the portion of the substrate, which portion is at the outer side of the chamber, absorption of moisture from the both surfaces is suppressed.

An invention of a second aspect has the feature that, both surfaces of a portion of the substrate disposed at the inner side of the chamber are also covered by the metal film.

In the image capturing device of the second aspect, the both surfaces of the substrate, not only at the portion disposed at the outer side of the chamber but also at the portion disposed at the inner side of the chamber, are covered by the metal film. Therefore, if by some chance the portion of the substrate, which portion is at the outer side of the chamber, were to absorb moisture, the moisture absorbed by the substrate would be prevented from being released into the chamber interior.

An invention of a third aspect has the feature that, in the image capturing device of the second aspect, an end surface(s) of the portion of the substrate at the outer side of the chamber is also covered by the metal film.

In the image capturing device of the third aspect, the end surface of the portion of the substrate, which portion is at the outer side of the chamber, also is covered by the metal film. Therefore, not only penetration of moisture from the both surfaces of the substrate, but also penetration of moisture from the end surface(s) of the substrate, can be effectively suppressed.

An invention of a fourth aspect has the feature that, in the image capturing device of any one of the first through third aspects, the metal film is a metal foil, and the metal foil is affixed to both the surfaces of the portion of the substrate at the outer side of the chamber.

In the image capturing device of the fourth aspect, the metal foil is affixed to the both surfaces of the substrate. Therefore, as compared with a form in which a metal film is formed by deposition or plating on the both surfaces (and end surface(s)) of the substrate, a more certain moisture proofing (dampproofing) effect with low cost and easy way is obtained, and further, a light-blocking effect also can be anticipated.

An invention of a fifth aspect has the feature that, in the image capturing device of the fourth aspect, the metal foil is affixed to both the surfaces of the substrate by a black-colored adhesive, a pressure-sensitive adhesive, or a pressure-sensitive double-sided adhesive tape.

In the image capturing device of the fifth aspect, the metal film on the substrate surfaces is formed by affixing the metal foil to the both surfaces (and end surface(s)) of the substrate by a black-colored pressure-sensitive adhesive, adhesive, or pressure-sensitive double-sided adhesive tape. Therefore, even if outside light is transmitted through the metal foil, the outside light is blocked by the layer of the pressure-sensitive adhesive or the adhesive, or by the pressure-sensitive double-sided adhesive tape.

An invention of a sixth aspect has the feature that, in the image capturing device of any one of the first through fifth aspects, the substrate is a flexible substrate, and wiring is provided at an interior of the substrate.

In the image capturing device of the sixth aspect, because a flexible substrate is used as the substrate, the degrees of freedom in placement of the image capturing element (an CCD) at the chamber interior are high. Further, because the wiring is provided at the interior of the substrate, there is no need to provide an insulating layer on the surface of the substrate so that the wiring is not short-circuited by the metal film, which is different than a case in which the wiring is provided on the surface of the substrate.

In accordance with the present invention, there is provided an image capturing device that carries out image capturing while cooling an image capturing element, and in which the penetration of moisture into a chamber interior is effectively suppressed.

BRIEF DESCRIPTION OF THE DRAWINGS

An exemplary embodiment of the present invention will be described in detail with reference to the following figures, wherein.

DETAILED DESCRIPTION OF THE INVENTION

Exemplary Embodiment

Figure 1:
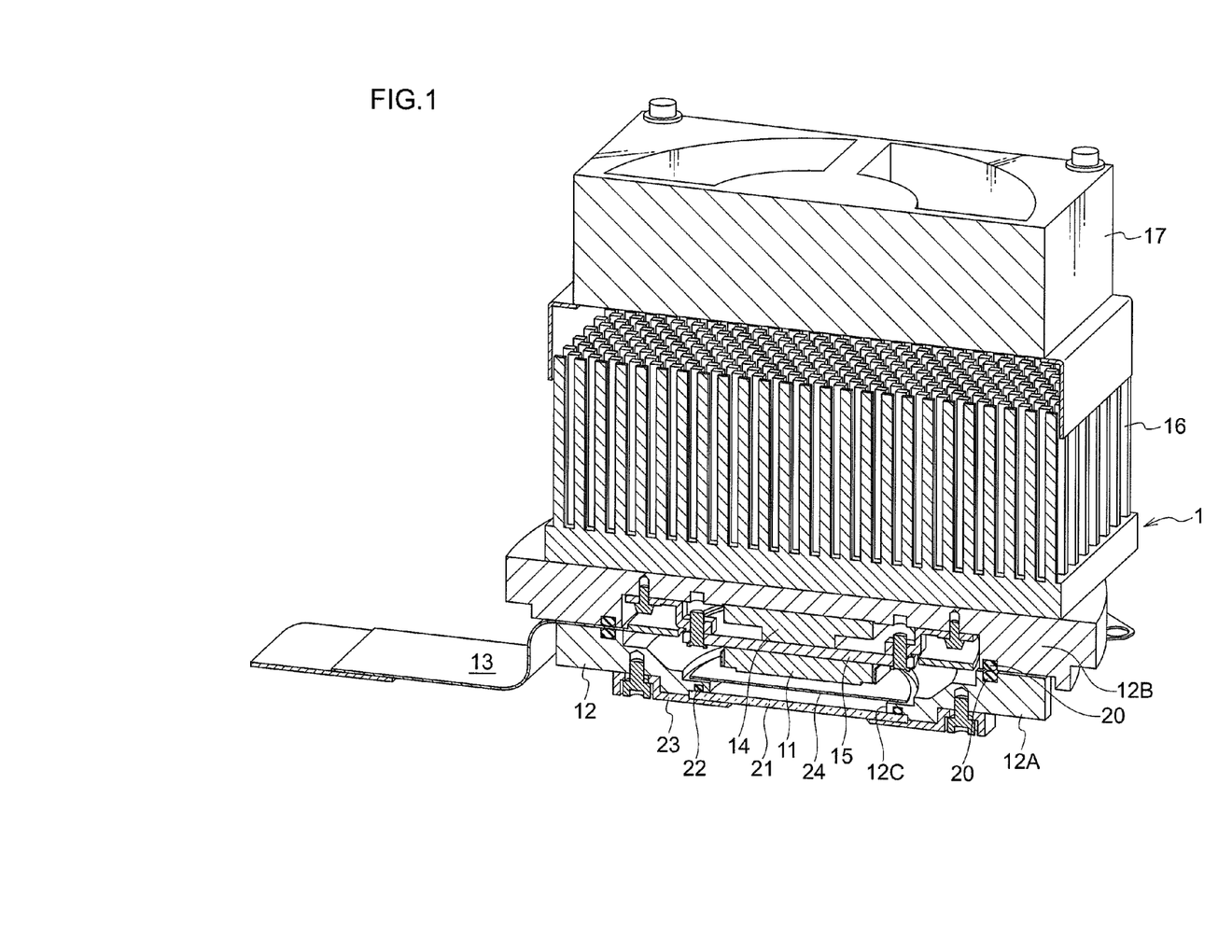
FIG. 1 is a perspective sectional view showing the overall structure of the vicinity of a chamber of an image capturing device relating to the exemplary embodiment.
Figure 2:
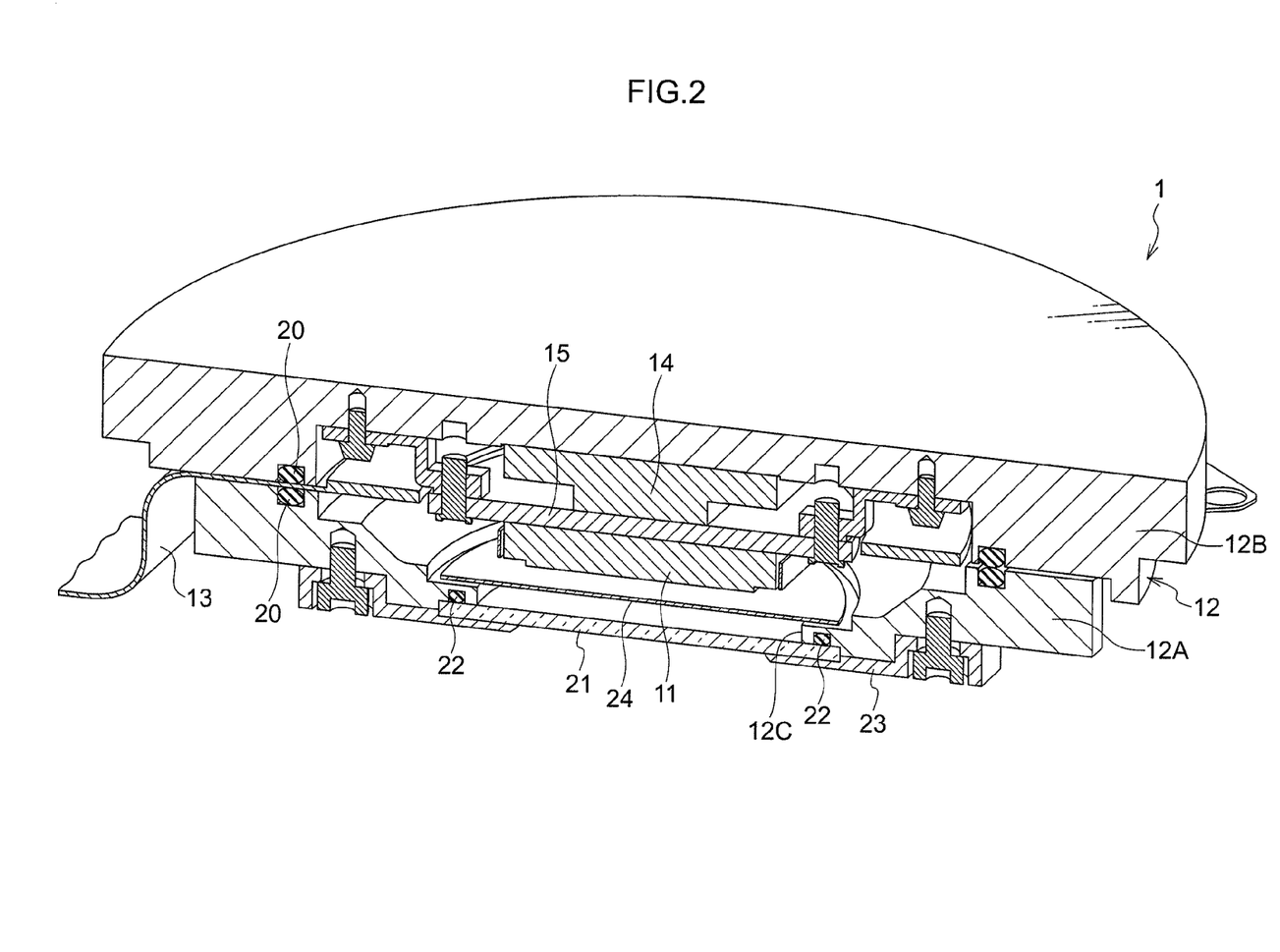
FIG. 2 is an enlarged view showing the structure of the chamber of the image capturing device relating to the exemplary embodiment.
Figure 3:
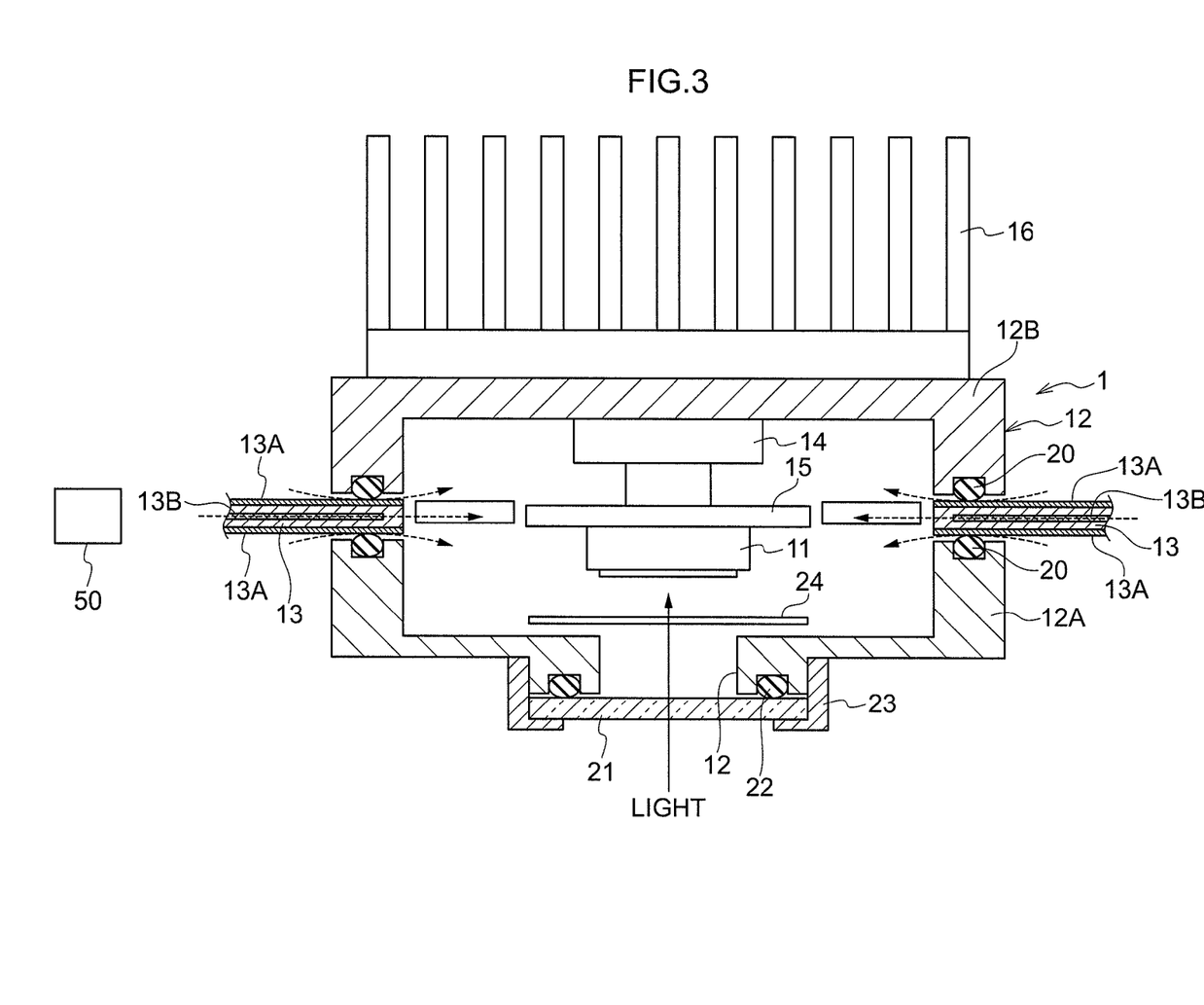
FIG. 3 is an explanatory diagram showing the preventing of penetration of moisture through a substrate and into the chamber, by aluminum foil on the substrate surfaces in the image capturing device relating to the exemplary embodiment.

An example of an image capturing device relating to the present invention is described hereinafter by using the drawings. As shown in FIG. 1 through FIG. 3, an image capturing device 1 of the exemplary embodiment has a CCD 11 serving as an example of an image capturing element, a chamber 12 that accommodates the CCD 11, a flexible substrate 13 that is an example of a substrate and that connects the CCD 11 and an external circuit 50 that is positioned at the exterior of the chamber 12, a Peltier element 14 that is accommodated, together with the CCD 11, in the chamber 12 in order to cool the CCD 11, a cooling plate 15 that is positioned between the CCD 11 and the Peltier element 14 and to which the CCD 11 is fixed, heat dissipating fins (a fin portion) 16 that are fixed to the top surface of the chamber 12, and a cooling fan 17 that is fixed above the heat dissipating fins 16. The CCD 11 is fixed to the Peltier element 14 via the cooling plate 15.

The chamber 12 is structured from a lower side chamber 12A that is positioned below the CCD 11 and structures the lower half of the chamber 12, and an upper side chamber 12B to which the Peltier element 14 is fixed and that structures the upper half of the chamber 12. The portion, in the vicinity of the CCD 11, of the flexible substrate 13 is nipped between the lower side chamber 12A and the upper side chamber 12B. O-rings 20 are interposed between the lower side chamber 12A and the flexible substrate 13, and between the upper side chamber 12B and the flexible substrate 13.

There is an opening portion 12C in the bottom portion of the lower side chamber 12A, and the opening portion 12C is closed by a cover glass 21. The cover glass 21 is fixed to the bottom surface of the lower side chamber 12A by a cover glass presser (holder) 23. An O-ring 22 is interposed between the cover glass 21 and the lower side chamber 12A.

A condensation (dew formation) preventing glass 24 is fixed to the surface of the lower side chamber 12A, at the upper side of the opening portion 12C.

Dry nitrogen gas is filled into the chamber 12.

Note that a lens, a shutter, and a light-blocking member (none of which is illustrated in the drawings) are provided beneath the chamber 12.

Figure 7:
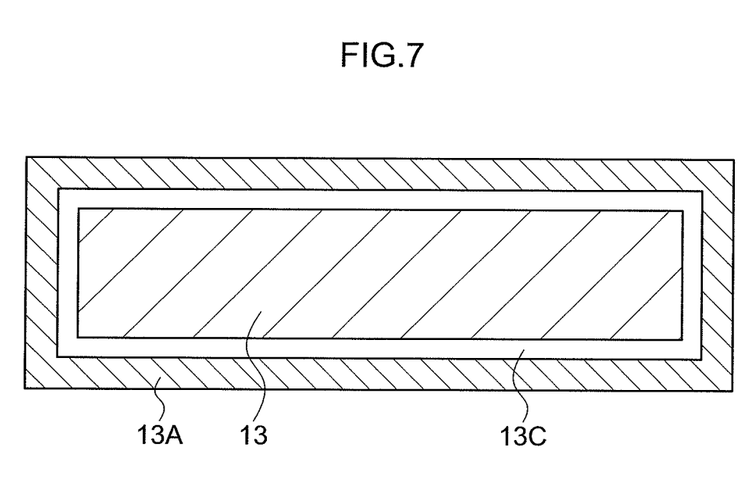
FIG. 7 is an enlarged cross sectional view showing the structure of the substrate of the image capturing device relating to exemplary embodiment.

As shown in FIG. 3, both surfaces of the flexible substrate 13 are covered by aluminum foil 13A that serves as an example of a metal film. The aluminum foil 13A is affixed to the flexible substrate by a black-colored pressure-sensitive adhesive, adhesive, or pressure-sensitive double-sided adhesive tape 13C (FIG. 7). Note that a metal foil such as copper foil, gold foil, silver foil or the like may be used instead of the aluminum foil 13A to cover both surfaces of the flexible substrate 13. At the flexible substrate 13, a wiring pattern 13B is provided at the interior of the flexible substrate 13. Due thereto, there is no need to provide an insulating film on the surface of the flexible substrate 13. The end surfaces (edges) of the flexible substrate 13 also can be covered by the aluminum foil 13A. For example, it is possible that whole outer peripheral portion of the flexible substrate 13 is covered by the aluminum foil 13A (FIG. 7).

In a case in which the flexible substrate 13 is a resin that has a glass transition temperature, in order to affix the aluminum foil 13A, instead of using a black-colored pressure-sensitive adhesive, adhesive, or pressure-sensitive double-sided adhesive tape 13C, the aluminum foil 13A may be superposed on both surfaces of the flexible substrate 13 and thermocompression-bonding may be carried out by passing it between a pair of rollers in a state of being heated to greater than or equal to the glass transition point. Further, instead of affixing a metal foil such as the aluminum foil 13A or the like to the flexible substrate 13, a metal such as aluminum, copper, gold, silver or the like may be deposited (for example, vapour-deposited) so as to form a metal film.

Operation of the image capturing device 1 is described hereinafter.

Light that is incident on the image capturing device passes through the lens, the shutter, the cover glass 21 and the condensation preventing glass 24, and is detected at the CCD 11.

On the other hand, the Peltier element 14 is energized such that the surface thereof, which surface is at the side to which the CCD 11 is fixed via the cooling plate 15, becomes the cooling surface, and due thereto, the CCD 11 is cooled to a predetermined temperature within the range of, for example, −20° C. to −30° C. On the other hand, the surface of the Peltier element 14, which surface is at the side that is fixed to the upper side chamber 12B, becomes a heating surface. The heat that is discharged from the heating surface of the Peltier element 14 passes through the upper side chamber 12B, is transmitted to the heat dissipating fins 16, and is discharged to the exterior at the heat dissipating fins 16.

Figure 5:
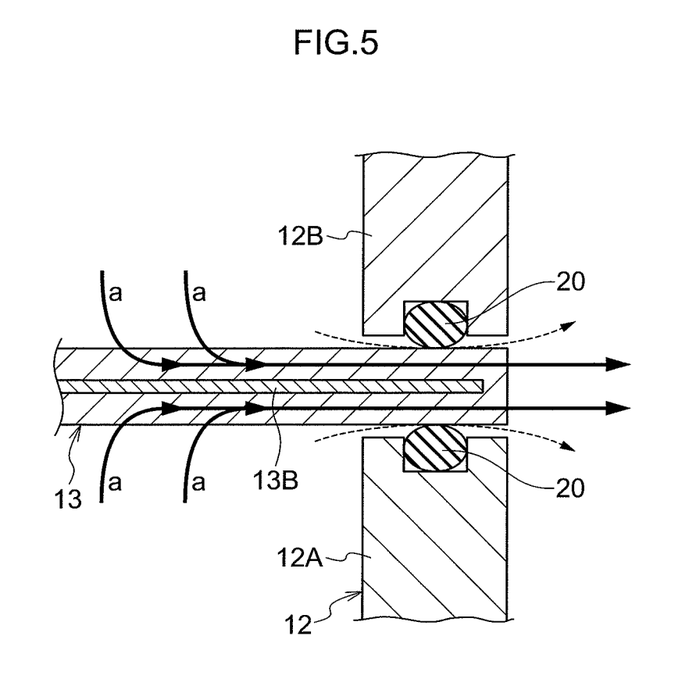
FIG. 5 is an enlarged explanatory diagram showing penetration of moisture through a substrate and into a chamber, in an image capturing device in which aluminum foil is not affixed to both surfaces of the substrate.

The CCD 11 is cooled by the Peltier element 14 as described above, the interior of the chamber 12 also is cooled. Here, a film of a polyimide resin or an aromatic polyamide resin is generally used as the flexible substrate 13, and therefore, if the aluminum foil 13A is not affixed to the both surfaces of the flexible substrate 13, moisture in the outside air penetrates (infiltrates) into the interior of the flexible substrate 13 from the both surfaces of the flexible substrate 13 as shown by arrows a in FIG. 5. Then, this moisture diffuses through the interior of the flexible substrate 13 toward the interior of the chamber 12. Due thereto, moisture in the outside air penetrates into the chamber 12.

Figure 4:
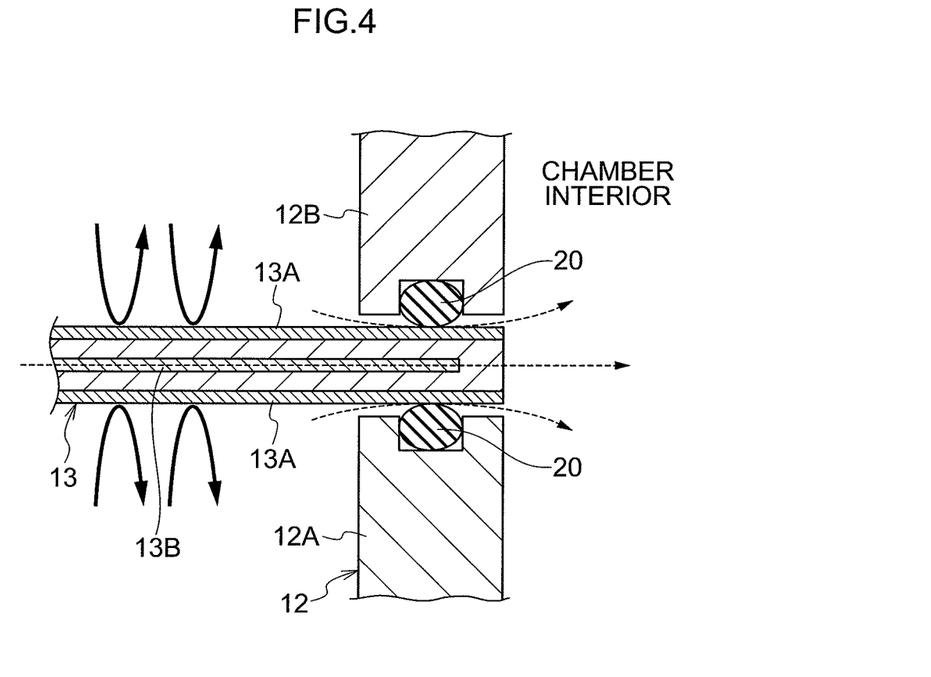
FIG. 4 is an enlarged explanatory diagram showing the preventing of penetration of moisture through the substrate and into the chamber, by aluminum foil on the substrate surfaces in the image capturing device relating to the exemplary embodiment.

In contrast, at the image capturing device 1 of the exemplary embodiment, as described above, the aluminum foil 13A is affixed to the both surfaces of the flexible substrate 13. Therefore, as shown in FIG. 4, diffusion of moisture in the outside air into the interior of the flexible substrate 13 is obstructed by the aluminum foil 13A. Further, in a case where the aluminum foil 13A is affixed also to the end surfaces of the flexible substrate 13, penetration of moisture from the end surfaces of the flexible substrate 13 also is prevented. Accordingly, moisture that has penetrated from the both surfaces and the end surfaces of the flexible substrate 13 is prevented from diffusing within the flexible substrate 13 and penetrating into the chamber 12.

EXAMPLES

Example 1, Comparative Example 1

A test of penetration of moisture into the chamber 12 is carried out on the image capturing device 1 shown in FIG. 1 through FIG. 3. This moisture penetration test is carried out by measuring the humidity of the interior of the chamber 12 while repeating the processes of leaving the image capturing device 1 for a fixed time at a temperature of 28° C. and a humidity of 10%, and thereafter, leaving the image capturing device 1 for a fixed time at a temperature of 28° C. and a humidity of 80%.

Example 1 is an example that uses the flexible substrate 13 to whose both surfaces the aluminum foil 13A is affixed. Comparative Example 1 is an example that uses the flexible substrate 13 to which the aluminum foil 13A is not affixed. The results are shown in FIG. 6.

Figure 6:
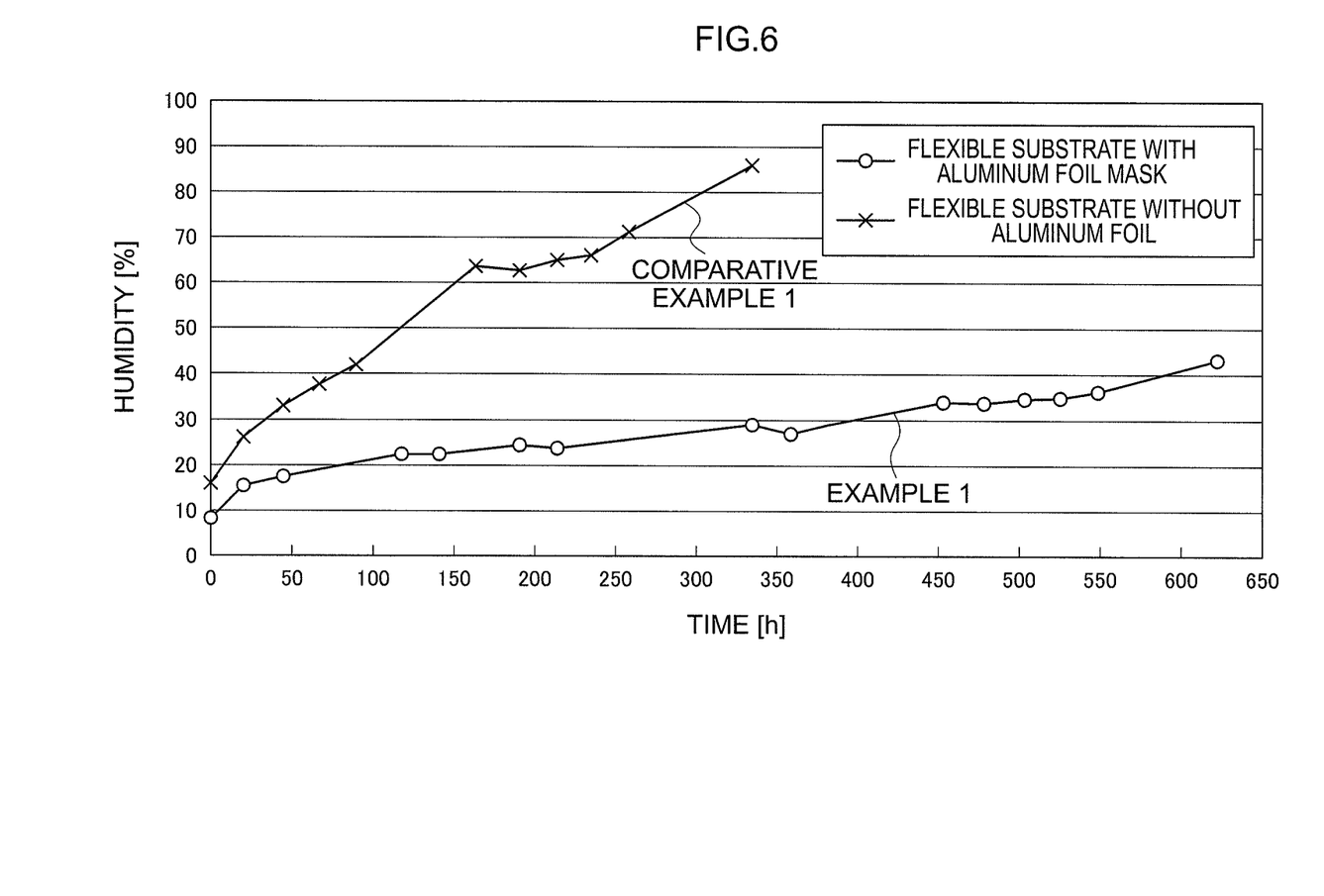
FIG. 6 is a graph showing changes in humidity at the chamber interior the image capturing device of the exemplary embodiment and in the image capturing device in which aluminum foil is not affixed to both surfaces of the substrate.

As shown in FIG. 6, in Example 1, the humidity of the interior of the chamber 12 at the time of the start of testing is 10%. 100 hours after the start of testing, the humidity merely rises to around 20%. Around 360 hours after the start of testing, the humidity merely rises to 30%. 580 hours after the start of testing, the humidity merely rises to around 40%.

In contrast, in Comparative Example 1 in which the aluminum foil 13A is not affixed to the flexible substrate 13, the humidity of the interior of the chamber 12 at the time of the start of testing is 20%. Around 20 hours after the start of testing, the humidity rises to around 30%. Around 70 hours after the start of testing, the humidity rises to around 40%. 150 hours after the start of testing, the humidity rises to around 60%. Around 330 hours after the start of testing, the humidity is 85% which is a higher humidity than the outside air. In this way, it can be understood that, in Comparative Example 1, the humidity of the interior of the chamber 12 rises far more quickly than in Example 1.

What is claimed is:

1. An image capturing device comprising:
   an image capturing element;
   a chamber that accommodates the image capturing element at an inner side of the chamber;
   a cooling section that is provided within the chamber, and that cools the image capturing element; and
   a substrate that is provided so as to bridge between the inner side and an outer side of the chamber, and that connects the image capturing element to an electronic circuit provided at an exterior of the chamber,
   wherein at least both surfaces facing opposite directions of a portion of the substrate, the portion located at the outer side of the chamber, are covered by a metal film for preventing moisture outside of the chamber from entering into an interior of the substrate through the opposite facing surfaces of an outside portion of the substrate, the substrate is a flexible substrate, and wiring is provided at an interior of the substrate.

2. The image capturing device of claim 1, wherein both surfaces facing opposite directions of a portion of the substrate disposed at the inner side of the chamber are also covered by the metal film.

3. The image capturing device of claim 2, wherein an end surface of the portion of the substrate at the outer side of the chamber is also covered by the metal film.

4. The image capturing device of claim 1, wherein the metal film is a metal foil, and the metal foil is affixed to both the opposite facing surfaces of the portion of the substrate at the outer side of the chamber.

5. The image capturing device of claim 2, wherein the metal film is a metal foil, and the metal foil is affixed to both the opposite facing surfaces of the portion of the substrate at the inner side of the chamber.

6. The image capturing device of claim 3, wherein the metal film is a metal foil, and the metal foil is affixed to both the opposite facing surfaces of both the portions of the substrate.

7. The image capturing device of claim 4, wherein the metal foil is affixed to both the opposite facing surfaces of the substrate by a black-colored adhesive, a pressure-sensitive adhesive, or a pressure-sensitive double-sided adhesive tape.

8. The image capturing device of claim 5, wherein the metal foil is affixed to both the opposite facing surfaces of the substrate by a black-colored adhesive, a pressure-sensitive adhesive, or a pressure-sensitive double-sided adhesive tape.

9. The image capturing device of claim 6, wherein the metal foil is affixed to both the opposite facing surfaces of the substrate by a black-colored adhesive, a pressure-sensitive adhesive, or a pressure-sensitive double-sided adhesive tape.

* * * * *